(12) United States Patent
Robinson et al.

(10) Patent No.: US 10,453,242 B2
(45) Date of Patent: Oct. 22, 2019

(54) VISUALIZATION INCLUDING MULTIDIMENSIONAL GRAPHLETS

(71) Applicant: HEWLETT-PACKARD DEVELOPMENT COMPANY, L.P., Houston, TX (US)

(72) Inventors: Ian N Robinson, Palo Alto, CA (US); Nelson L Chang, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 36 days.

(21) Appl. No.: 15/501,231

(22) PCT Filed: Oct. 29, 2014

(86) PCT No.: PCT/US2014/062847
§ 371 (c)(1),
(2) Date: Feb. 2, 2017

(87) PCT Pub. No.: WO2016/068901
PCT Pub. Date: May 6, 2016

(65) Prior Publication Data
US 2017/0228917 A1    Aug. 10, 2017

(51) Int. Cl.
*G06T 15/00*    (2011.01)
*G06T 19/00*    (2011.01)
*G06T 11/20*    (2006.01)

(52) U.S. Cl.
CPC .......... *G06T 15/005* (2013.01); *G06T 11/206* (2013.01); *G06T 19/00* (2013.01)

(58) Field of Classification Search
None
See application file for complete search history.

(56) References Cited

U.S. PATENT DOCUMENTS

| | | | | |
|---|---|---|---|---|
| 6,222,557 B1* | 4/2001 | Pulley, IV | ............ | G06T 11/206 345/622 |
| 6,301,579 B1* | 10/2001 | Becker | .............. | G06F 17/30592 |
| 6,400,366 B1* | 6/2002 | Davies | .................. | G06T 11/206 345/440 |
| 6,707,454 B1* | 3/2004 | Barg | ...................... | G06F 17/246 345/440 |
| 7,639,256 B1 | 12/2009 | Yablonski et al. | | |
| 8,797,319 B2 | 8/2014 | Lin et al. | | |
| 9,465,891 B1* | 10/2016 | Kagan | ................... | G06F 16/904 |

(Continued)

OTHER PUBLICATIONS

Benjamin Bach, Emmanuel Pietriga and Jean-Daniel Fekete; Visualizing Dynamic Networks with Matrix Cubes; Apr. 26, 2014 to May 1, 2014; http://hal.inria.fr/docs/00/93/20/90/PDF/Bach2014cubix.pdf.

(Continued)

*Primary Examiner* — James A Thompson
(74) *Attorney, Agent, or Firm* — Trop. Pruner & Hu P.C.

(57) ABSTRACT

A visualization includes a multidimensional array of multidimensional graphlets, the multidimensional array arranging the multidimensional graphlets in a plurality of dimensions, where each of the multidimensional graphlets includes at least three dimensions. Respective attributes of data are represented with the plurality of dimensions of the multidimensional array. Respective additional attributes of the data are represented with the dimensions of the multidimensional graphlets.

19 Claims, 6 Drawing Sheets

(56) References Cited

U.S. PATENT DOCUMENTS

| | | |
|---|---|---|
| 9,665,988 B2* | 5/2017 | Djorgovski ............ G06T 19/006 |
| 9,779,077 B2* | 10/2017 | van den Broek ... G06F 3/04842 |
| 2003/0071814 A1* | 4/2003 | Jou ..................... G06F 9/542 |
| | | 345/440 |
| 2004/0075656 A1* | 4/2004 | Kimia .................... G06T 17/00 |
| | | 345/420 |
| 2005/0028198 A1* | 2/2005 | Robbins ............... G06T 11/206 |
| | | 725/39 |
| 2006/0061589 A1* | 3/2006 | Suyama ............... G06F 3/0482 |
| | | 345/606 |
| 2007/0097113 A1* | 5/2007 | Lee ....................... G06F 3/0346 |
| | | 345/419 |
| 2007/0211056 A1 | 9/2007 | Chakraborty et al. |
| 2008/0103863 A1* | 5/2008 | Holm-Petersen ...... G06Q 10/06 |
| | | 705/7.27 |
| 2009/0135175 A1 | 5/2009 | Lobregt et al. |
| 2009/0262131 A1* | 10/2009 | Suntinger ............. G06Q 10/06 |
| | | 345/619 |
| 2010/0042913 A1 | 2/2010 | Chamberlain et al. |
| 2011/0131250 A1* | 6/2011 | Stolte .................... G06F 17/246 |
| | | 707/802 |
| 2011/0138265 A1 | 6/2011 | Balaram et al. |
| 2012/0060078 A1 | 3/2012 | Beauchamp et al. |
| 2012/0062549 A1* | 3/2012 | Woo .................... G06F 3/04815 |
| | | 345/419 |
| 2012/0200567 A1* | 8/2012 | Mandel ................. G06T 11/206 |
| | | 345/420 |
| 2012/0317508 A1* | 12/2012 | Schone .................. G06F 17/30 |
| | | 715/772 |
| 2013/0097563 A1* | 4/2013 | Pacheco Rodrigues Velho ......... |
| | | G06F 3/04815 |
| | | 715/850 |
| 2015/0205840 A1* | 7/2015 | Yerli ...................... G06F 16/26 |
| | | 707/722 |
| 2015/0229375 A1* | 8/2015 | Vook ................... H04B 7/0469 |
| | | 370/329 |
| 2015/0294275 A1* | 10/2015 | Richardson ............ G06F 16/26 |
| | | 705/7.18 |

OTHER PUBLICATIONS

Hewlett-Packard Development Company, L.P., International Application No. PCT/US2013/063978, entitled "Displaying Multivariate Data in Multiple Dimensions," filed Oct. 9, 2013 (20 pages).

Mario Roadster and M. Anthony Moody; Polychromatic Plots: Graphical Display of Multidimensional Data; Sep. 2008; http://www.ncbi.nlm.nih.gov/pmc/articles/PMC2583940/.

* cited by examiner

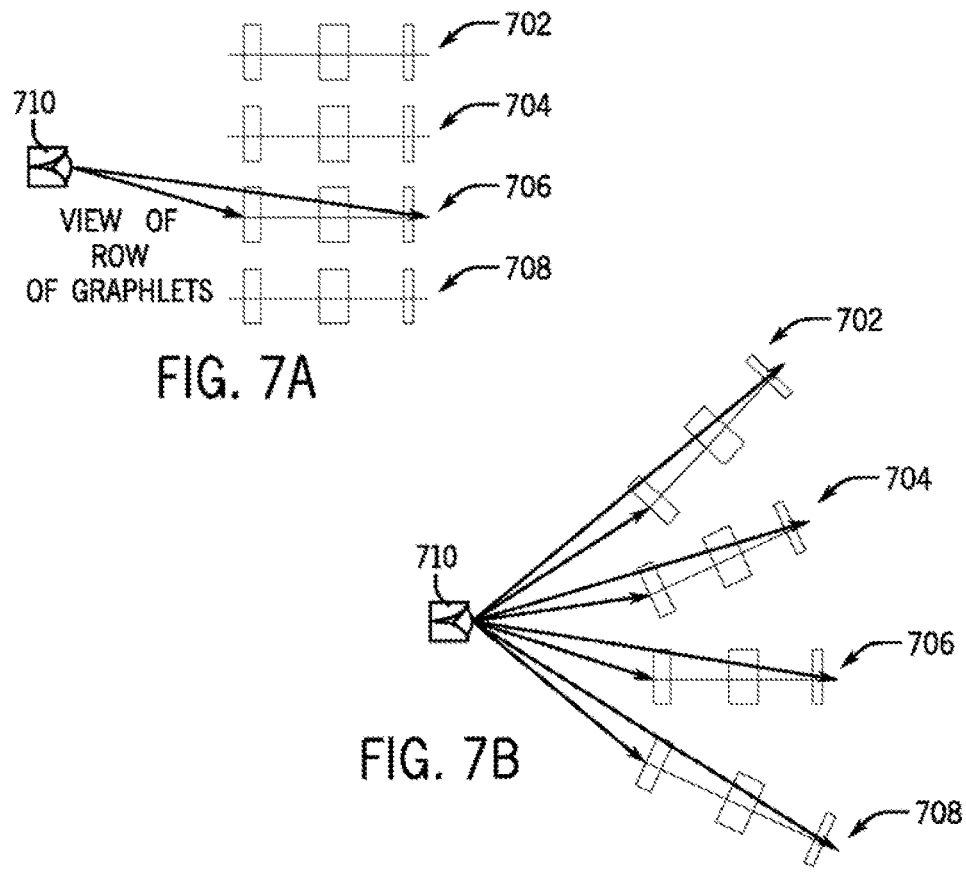
FIG. 7A
FIG. 7B
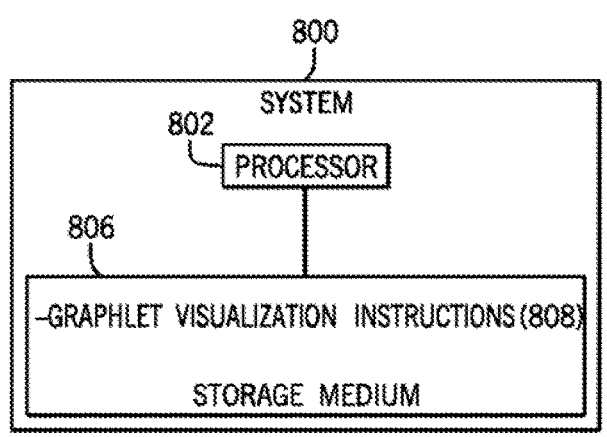
FIG. 8

VISUALIZATION INCLUDING MULTIDIMENSIONAL GRAPHLETS

BACKGROUND

A data collection that includes data records can be visualized in a graphical visualization. In the graphical visualization, graphical elements can represent various attributes of the data records. In some cases, a graphical visualization can be a two-dimensional (2D) visualization. In other examples, a graphical visualization can be a three-dimensional (3D) visualization.

BRIEF DESCRIPTION OF THE DRAWINGS

Some implementations are described with respect to the following figures.

FIGS. 7A-7B are schematic diagrams of example views of rows of graphlets, of an example according to further implementations.

FIG. 8 is a block diagram of are example system according to some implementations.

DETAILED DESCRIPTION

Data records in a data collection can have a relatively large number of different attributes. Examples of data records include files, documents, objects (e.g. images, video data, etc.), user feedback comments on websites, and so forth. As examples, data records pertaining to employees of an enterprise (e.g. business concern, educational organization, government agency, etc.) can include the following attributes: employee name, employee number, department the employee works for, employee position, social security number, salary, number of years employed, employee ranking, geographic region, and other attributes. As another example, data records pertaining to operation of an information technology (IT) system of an enterprise can include the following attributes: processor utilization, network utilization, storage utilization, device temperature, applications used, detected faults or errors, geographic region, and other attributes. As a further example, data records pertaining to sales activities of an enterprise can include the following attributes: product name, service name, state, country, sales amount, profit, cost, vendors, customer sentiment, and other attributes.

There can be numerous other examples of attributes, including structured and unstructured attributes, in other types of data records.

Visualization tools often allow for visualization of a relatively small number of attributes, based on the general assumption that users know what attributes are of interest and can thus select a subset of attributes to represent in a visualization. However, this may not be true in many cases, particularly for a data collection that includes a large number of attributes. In such cases, it may be beneficial to visualize a larger number of attributes concurrently, so that users can discover trends, patterns, or anomalies, which can then be used to determine which subset of attributes is of interest.

In accordance with some implementations, visualization techniques or mechanisms are provided to allow for visualization of a larger number of attributes simultaneously so that users are presented with more information than provided by visualizations that are able to represent a smaller number of attributes. In this way, users are able to more easily detect patterns, trends, or anomalies, and can thus better focus on (and select) attributes that can allow the users to determine a cause of such patterns, trends, or anomalies. The visualization techniques or mechanisms according to some implementations are able to visualize the larger number of attributes with reduced or minimal occlusion of graphical elements representing data records of a data collection.

Figure 1:
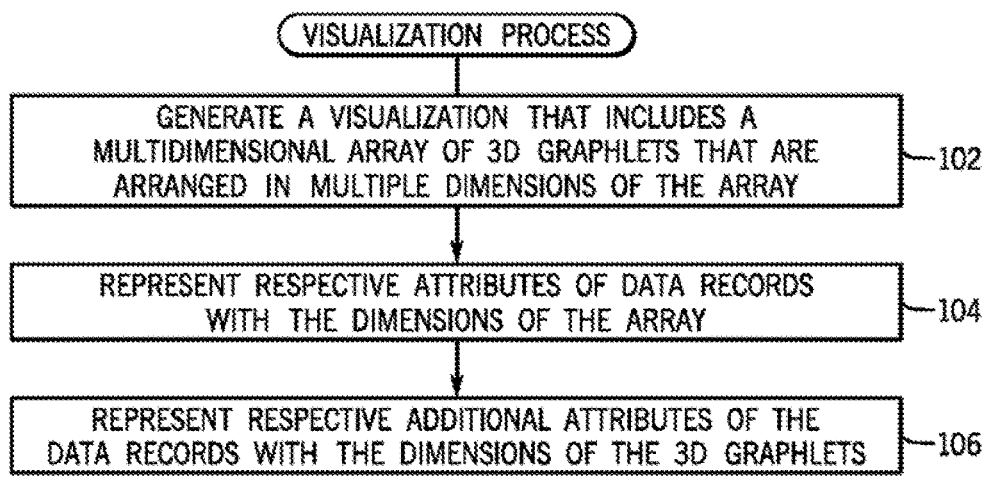
FIG. 1 is a flow diagram of an example visualization process according to some implementations.

FIG. 1 is a flow diagram of a visualization process according to some implementations. The visualization process generates (at 102) a visualization that includes a multidimensional array of multidimensional graphlets (e.g. three-dimensional or 3D graphlets). The multidimensional (e.g. 3D) array arranges the 3D graphlets in multiple dimensions (e.g. three dimensions).

A 3D graphlet is a graphical element that has multiple (e.g. at least three) dimensions. For example, the 3D graphlet can have a height dimension, a width dimension, and a depth dimension. More generally, a multidimensional graphlet can have three or more than three dimensions. As examples, in addition to the height dimension, width dimension, and depth dimension, a multidimensional graphlet can have further dimension(s), such as a color, a shape, motion, and so forth.

Although reference is made in the present disclosure to 3D graphlets, it is noted that "3D graphlet" is intended to refer to either a graphlet with just three dimensions, or a graphlet with more than three dimensions.

The visualization process represents (at 104) respective attributes of data records with the dimensions of the 3D array. The attributes represented by the dimensions of the 3D array are included in a first set of attributes.

In some examples, the attributes of the first set can include categorical attributes. A categorical attribute is an attribute that has multiple categorical values. An example of a categorical attribute is a country attribute, where the different values of the country attribute represent different countries (which are examples of different categories). In other examples, the attributes of the first set can include numerical attributes. A numerical attribute is an attribute that can have different numerical values from across a range of values. In some cases, the attributes of the first set can include both categorical and numerical attributes.

The visualization process represents (at 106) respective additional attributes of the data records with the dimensions of the 3D graphlets. The additional attributes are part of a second set of attributes that are distinct from the first set of attributes (i.e. the attributes of the first set can be completely distinct from the attributes of the second set). The attributes of the second set can include categorical attributes and/or numerical attributes. In other examples, the first set and the second set of attributes may overlap.

Figure 2:
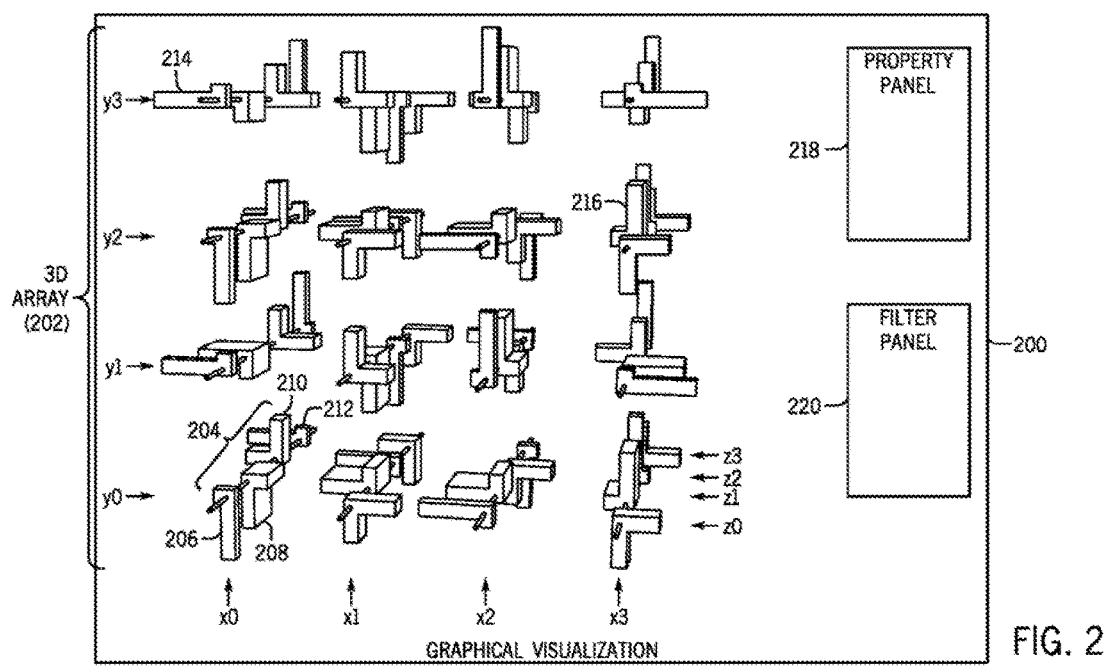
FIG. 2 is a schematic diagram of an example graphical visualization of a three-dimensional (3D) array of 3D graphlets, in accordance with some implementations.

FIG. 2 depicts an example interactive graphical visualization 200 that includes a 3D array 202 of 3D graphlets. The graphlets are arranged in three dimensions of the 3D array 202, where the three dimensions of the 3D array 202 can represent an x attribute, a y attribute, and a z attribute, respectively. In the example shown in FIG. 2, the three dimensions represent respective attributes of the data records that are represented by the 3D graphlets. The y dimension of the 3D array represents y attribute values, e.g. y0, y1, y2, and y3. The x dimension of the 3D array represents x attributes that have the following x attribute values: x0, x1, x2, and x3. The z dimension represents the following z attribute values: z0, z1, z2, and z3.

In the ensuing discussion, reference is made to the graphlets along the z dimension as being a row of graphlets (e.g. row 204 shown in FIG. 2). More generally, graphlets along any of the dimensions (x, y, z) can be referred to as a line of graphlets along the respective dimension. The presentation of the 3D graphlets can be non-uniform across the attributes. Alternatively, the presentation of the 3D graphlets can be uniform along one axis, but non-uniform along a different axis.

In the example of FIG. 2, the row 204 of graphlets include graphlets 206, 208, 210, and 212, where each graphlet is a 3D graphical element that has at least three dimensions, such as a height dimension, a width dimension, and a depth dimension. The graphlet 206 represents a data record that has an x attribute with value x0, a y attribute with value y0, and a z attribute with value z0. The graphlet 208 represents a data record that has an x attribute with value x0, a y attribute with value y0, and a z attribute with value z1.

The different orientations of the L-shaped 3D graphlets in FIG. 2 can indicate whether the values of the horizontal (x) and vertical (y) attributes are positive or negative. Thus if both horizontal and vertical values are positive, a graphlet will have an "L" orientation. However, if the horizontal value is negative, a graphlet will have a "J" orientation. Other orientations of graphlets correspond to other combinations of positive and negative values.

In other examples, adjacent 3D graphlets can provide different representations. For example, a 3D graphlet at a first position may represent a visualization of a first subset of attributes, while a 3D graphlet at a neighboring position may represent a visualization of a second, different subset of attributes (where the second subset can overlap or not overlap with the first subset).

Other graphlets assigned reference numerals in FIG. 2 include a graphlet 214 (which represents a data record having an x attribute with value x0, a y attribute with value y3, and a z attribute with value z0), and a graphlet 216 (which represents a data record having an x attribute with value x3, a y attribute with value y2, and a z attribute with value z1).

Different characteristics of each 3D graphlet can represent a respective different dimension of data records in a data collection. The different characteristics can include the three dimensions of the 3D graphlet. For example, the height dimension of the 3D graphlet can represent a first attribute, the width dimension of the 3D graphlet can represent a second attribute, and the depth dimension of the 3D graphlet can represent a third attribute. In addition, the 3D graphlet can have another characteristic, such as its color or shape that can represent yet a further attribute of a data record represented by the 3D graphlet. In some examples, the space allotted to each 3D graphlet in the visualization is fixed. As a result, as part of the process of generating the graphlets, the attribute values can be scaled as they are mapped to the graphlet properties (e.g. width, height, etc.) so that the maximum and minimum values in the data just fit within this allotted space. A similar process can be applied if the graphlet color is set to be a simple color ramp (e.g. between red and green) between minimum and maximum values for some other attribute.

In some examples, the 3D array 202 of graphlets can change over time. In this way, another attribute, such as a time attribute, can be represented by the change of the graphlets over time. For example, the graphlets' extents (e.g. height, width, and/or depth) and colors can be animated over time. For example, all the graphlets can start out tall and green, but as time progresses heights can start to reduce, then one graphlet turns red, then all its neighbors in one plane turn red, and so forth.

As further examples, a 3D graphlet can move. As an example, the 3D graphlet can vibrate at a frequency, with different vibration frequencies and/or vibration amplitudes used to represent respective different values of a corresponding attribute. In other examples, other graphlet motions (e.g. rotation, pulsing, etc.) can be used to represent a different attribute.

In other examples, instead of using motion of a 3D graphlet to represent a respective attribute of a data record, the motion of the 3D graphlet can instead be used to draw a user's attention to one or multiple moving 3D graphlets.

In addition, an array of data records represented by the visualization 200 can be explored by turning off and on the visibility of a subset of the graphlets within the visualization 200. For example, the front-most plane of graphlets (those associated with the z attribute with value z0, for example) may be turned off (rendered invisible), so as to better reveal the graphlets in the next plane (associated with the z attribute with value z1). Alternatively, only a second plane of graphlets can be left visible, with the rest of the array turned off. Planes are turned on and off by clicking on a respective axis label (clicking on z0, for example).

Instead of turning on or off graphlets, certain graphlets can be made less prominent while other graphlets can be made more prominent by adjusting the color and/or opacity of the graphlets. For example some graphlets can be made brighter to be more prominent while other graphlets are made less bright to be less prominent. Alternatively, some graphlets can be left opaque so as to be more prominent when other graphlets are made more transparent.

A 3D graphlet is thus a graphical element that can encode a number of different attributes of data. For example, the width, height, depth, and color of the graphical element can represent four respective attributes of data. If graphlet motion is used, potentially more attributes can be represented.

In the example of FIG. 2, each 3D graphlet can represent four attributes of data. When combined with the three additional attributes that can be represented by the three dimensions of the 3D array 202, the graphical visualization 202 that includes the 3D array 202 of 3D graphlets can represent seven attributes of data, which can be visualized to allow users to identify patterns, trends, or anomalies in data.

In the interactive graphical visualization 200 of FIG. 2, a property panel 218 and a filter panel 220 can be included, in some examples. The property panel 218 can be used to display properties of a selected graphlet (or selected graphlets). A user can interact with the graphical visualization 200 by selecting one or multiple graphlets in the 3D array 202. In response to selection of the graphlet(s), properties of the selected graphlet(s) can be displayed in the property panel 218. For example, the property panel 218 can depict values of the various attributes of data represented by the selected graphlet(s).

The filter panel 220 includes control elements that are manipulatable by a user to control an appearance of the displayed 3D array 202 of graphlets. The appearance of the 3D array 202 of graphlets can include setting data bounds and thresholds on the mapping of the attribute values to graphlet properties. Instead of using the maximum and minimum values in the data to determine the scaling of the mappings to the graphlet attributes, the user can supply their own data bounds and thresholds, to reduce the impact of wildly anomalous data values, or to focus on particular value ranges in the data. The user can also select from different color mappings that can be used to highlight interesting characteristics of the data, e.g. deviation from an average value. The control of the appearance of the 3D array of graphlets can allow a user to emphasize particular events or patterns in the visualized data.

In further examples, when data records of a data collection are first displayed, the data is scaled so that the maximum and minimum values all fit within a cubical (or other) volume allotted each graphlet. In some examples, a tool in the filter panel 220 can be used to adjust this volume, as well as the spacing between graphlet volumes. The tool can also allow thresholds to be set on any of the displayed graphlet attributes, such that if a displayed value does not exceed the threshold then the graphlet is not displayed. Moreover, a maximum value can be set on the extent of the graphlet in any of its dimensions. When a data record exceeds this maximum, then a marker, e.g. an arrow or other indicator, can be added to the graphlet in that dimension, indicating that the maximum value has been exceeded.

In some examples, the visualization tool can allow a user to manipulate a view of a 3D array of graphlets to best cover the ranges of data the user is interested in. Thresholding can be applied to "thin" the array by not visualizing data records that do not exceed, or alternatively, exceed, a respective threshold). Thinning the array makes it easier to pick out data records that meet certain conditions. Another way to accomplish this is to apply different color maps to the graphlets. These color maps are most simply generated as another data dimension in the input data, that gets mapped to the graphlet's color. The user can choose which of the "color dimensions" to apply to the data from a drop-down menu in the filter panel 220. Alternatively some simple analytics on the input data (e.g. rate of change) can be calculated within the system, and displayed using a color map.

Figure 3A:
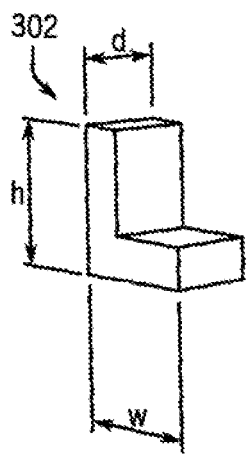
FIGS. 3A-3C illustrate example different types of 3D graphlets, in accordance with some implementations.
Figure 3B:
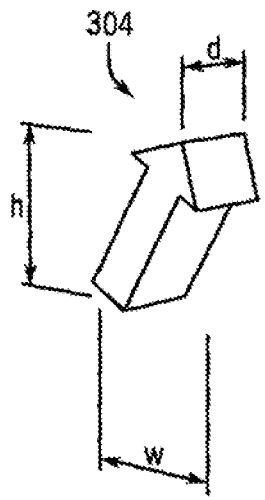
Figure 3C:
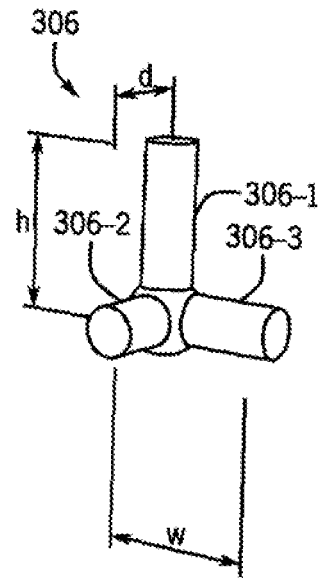

FIGS. 3A-3C depict various different example types of 3D graphlets. FIG. 3A shows a generally L-shaped 3D graphlet 302, which has a height dimension (h), a width dimension (w), and a depth dimension (d).

FIG. 3B shows another example of a 3D graphlet 304, which is generally shaped as an arrow. The arrow also has the three dimensions h, w, and d.

FIG. 3C shows yet another example of a 3D graphlet 306, which includes three legs (a vertical leg 306-1 and two orthogonal horizontal legs 306-2 and 306-3). The 3D graphlet 306 can also have the three dimensions h, w, and d.

In other examples, 3D graphlets of other shapes can be employed, where these other shapes of 3D graphlets also provide multiple (three or more) dimensions to allow for representation of respective different attributes of data.

As shown in FIG. 2, the 3D array 202 of graphlets is generally arranged in a cube. In other examples, different types of 3D arrays are possible, including a cylindrical array, a spherical array, an array that conforms to a surface (such as a topological map), and so forth.

In the 3D array 202 of graphlets depicted in FIG. 2, the same type of graphlets is used—more specifically, the type of graphlet used in the example visualization of FIG. 2 is an L-shaped 3D graphlet, similar to the graphlet depicted in FIG. 3A. In other examples, the 3D array 202 can include a mixture of different types of 3D graphlets.

Figure 4A:
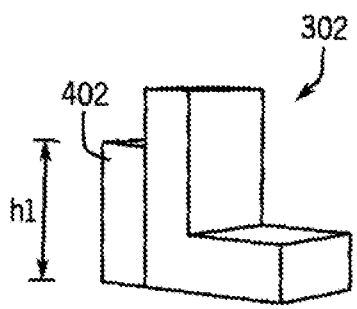
FIGS. 4A-4B are schematic diagrams of example 3D graphlets with additional visual features, in accordance with alternative implementations.
Figure 4B:
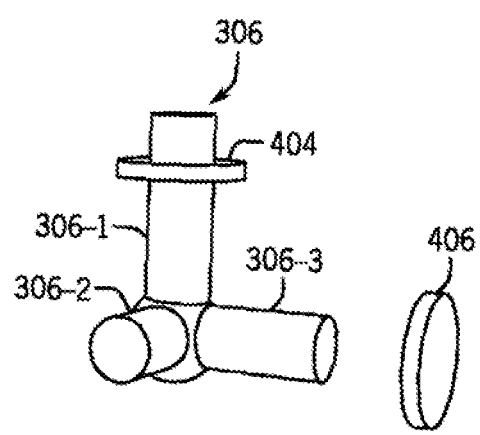

At least one additional visual feature can be added to each 3D graphlet to provide an additional indication, in addition to the representation of attribute values by the 3D graphlet. FIGS. 4A and 4B depict examples of additional visual features that can be added to respective 3D graphlets. FIG. 4A shows an L-shaped 3D graphlet 302 to which is added an additional bar 402. The bar 402 has a height h1 that can represent a value of another variable. For example, the value of the variable can be threshold value to which an attribute value along the h direction of the L-shaped 3D graphlet 302 is compared.

FIG. 4B shows the addition of a ring 404 with respect to the vertical leg 306-1 of a 3D graphlet 306. The ring 404 can represent an aggregate (e.g. average) of values of a respective attribute represented by the h dimension of the graphlet 306, for example. In other examples, the ring 404 can represent a different aggregate (e.g. sum, median, maximum, minimum, etc.) of values of the respective attribute.

FIG. 4B also shows the addition of a disk 406 with respect to the horizontal leg 306-3 of the 3D graphlet 306. The disk 406 can also represent an aggregate of values of a respective attribute represented by the w dimension of the graphlet 306, for example.

In further examples, a feature can be added to a 3D graphlet to indicate that a user has chosen a scale that causes one or multiple dimensions of the 3D graphlet to exceed its allotted cubicle volume. Each 3D graphlet is configured to fit within a given cubicle volume within the 3D array 202 in some examples. This is to prevent a situation where size of a graphlet becomes too big that it occupies too large a portion of the 3D array 202.

As discussed above, a 3D array (e.g. 202 in FIG. 2) of graphlets can have three dimensions that can represent three respective attributes of data. It is noted that in accordance with some implementations, an extrusion process can be performed to change the dimensions that are represented by a 3D array of graphlets. In the example of FIG. 2, the 3D array 202 has dimensions that represent the x, y, and z attributes. The extrusion process according to some implementations can allow for a 3D array of graphlets to have dimensions that represent a different group of dimensions, e.g. w, y, z. Assuming that the dimensions of interest to be represented using the dimensions of a 3D array of graphlets include w, x, y, z, the extrusion process allows for a user to selectively pick any three of the w, x, y, z attributes to visualize using a 3D array of graphlets. In the example of FIG. 2, it is assumed that a 3D array 202 of graphlets are for a specific value of w (e.g. w=0 or some other value).

Figure 5A:
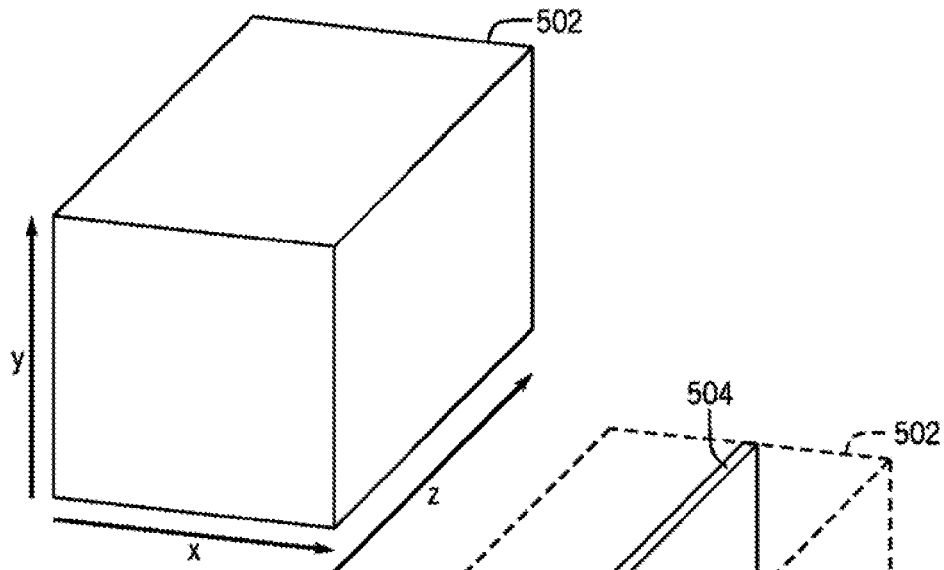
FIGS. 5A-5C illustrate an example extrusion process, according to further implementations.
Figure 5B:
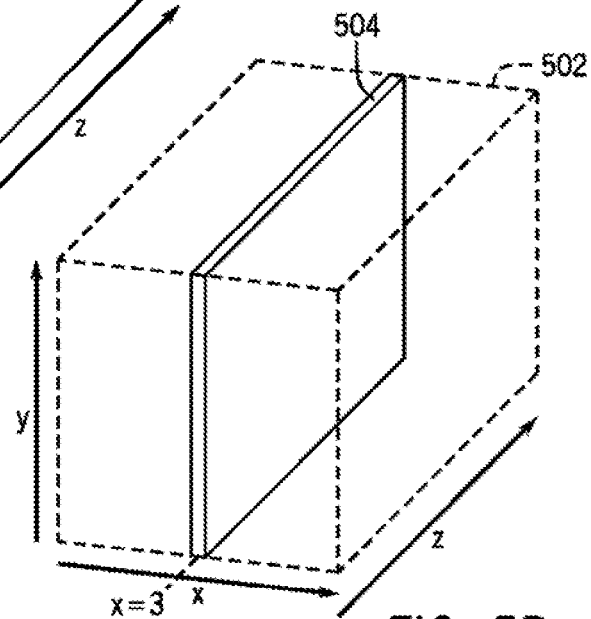
Figure 5C:
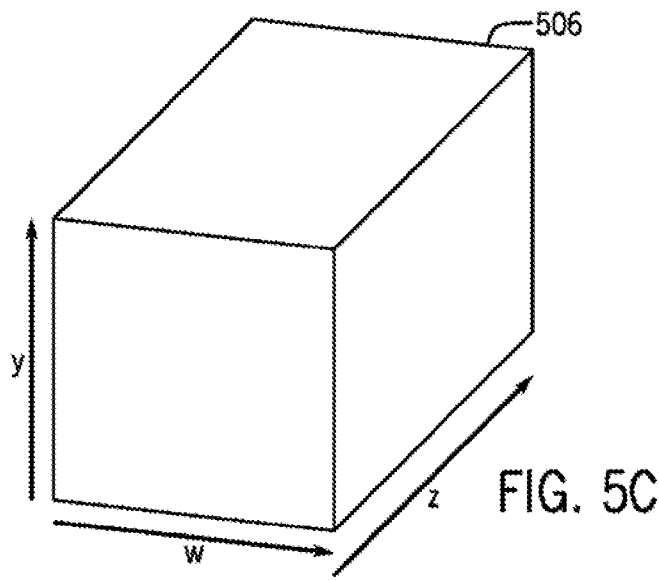

FIGS. 5A, 5B, and 5C depict an extrusion process according to some implementations. FIG. 5A shows a 3D array 502 of graphlets (the graphlets are not shown in FIGS. 5A-5C for better clarity). The 3D array 502 of graphlets include dimensions that represent the x, y, and z attributes. It is assumed that the 3D array 502 of graphlets are for a specific value of w, e.g. w=0.

To select a different group of dimensions to represent using a 3D array of graphlets, an extrusion process can be performed based on selection of a given slice (or plane) of the cube corresponding to the 3D array 502 of graphlets. In FIG. 5B, this slice is represented as 504, and corresponds to x=3.

A user can provide an input to indicate that extrusion is desired. This an include clicking and dragging a cursor in a given direction, or selecting a control menu item in a graphical user interface (GUI), as examples. In response to the extrusion selection input, a different 3D array 506 of graphlets is produced, as shown in FIG. 5C, where the dimensions of the 3D array 506 represent the w, y, and z attributes. The graphlets in the 3D array 506 of FIG. 5C correspond to data records for x=3.

At least one attribute of data represented by a 3D array of graphlets can be a hierarchical attribute. For example, an attribute can represent a geographic region. A 3D array of graphlets can initially represent a geographic region attribute at a higher hierarchical level, such as in larger geographic regions, e.g. Western Europe, Eastern Europe, Central Asia, Eastern Asia, South Asia, North America, South America, Africa, etc. However, a user can perform a drilldown selection to values at a lower hierarchical level. For example, a user may wish to visualize data records for different countries in Western Europe, such as Germany, France, Great Britain, and so forth. A drilldown selection can produce a different visualization that includes graphlets that correspond to member countries of Western Europe. At later time, a user can collapse the data records corresponding to the member countries of Western Europe back to the larger region, namely Western Europe.

Figure 6A:
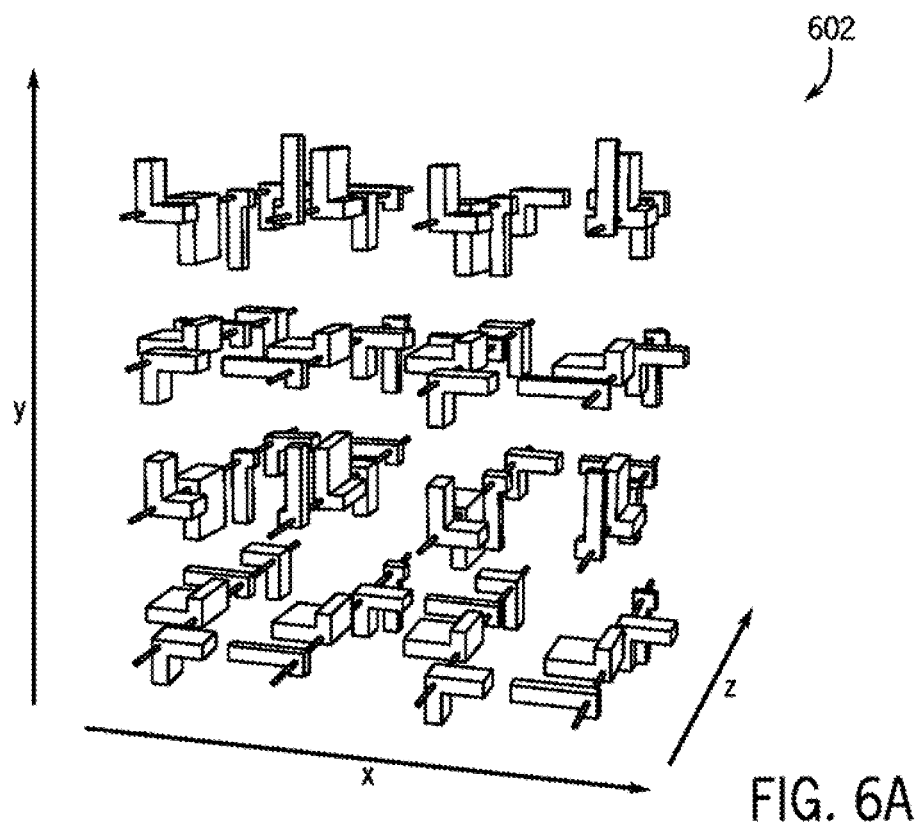
FIGS. 6A-6B are schematic diagrams of example 3D arrays of 3D graphlets according to different views, according to some implementations.

In accordance with some implementations, different views of a 3D array of graphlets can be provided. FIG. 6A shows a perspective projection (or view) of a 3D array 602 of graphlets along the rows (along the z dimension) of graphlets. With perspective projection, some rows are subjected to more perspective foreshortening, as shown in FIG. 6A, which can result in greater occlusion of graphlets further down each row. In other words, occlusion can occur for graphlets deeper in a row (i.e. further into the page shown in FIG. 6A). Also, at more extreme angles, one row of graphlets may start to occlude its neighboring row.

Figure 6B:
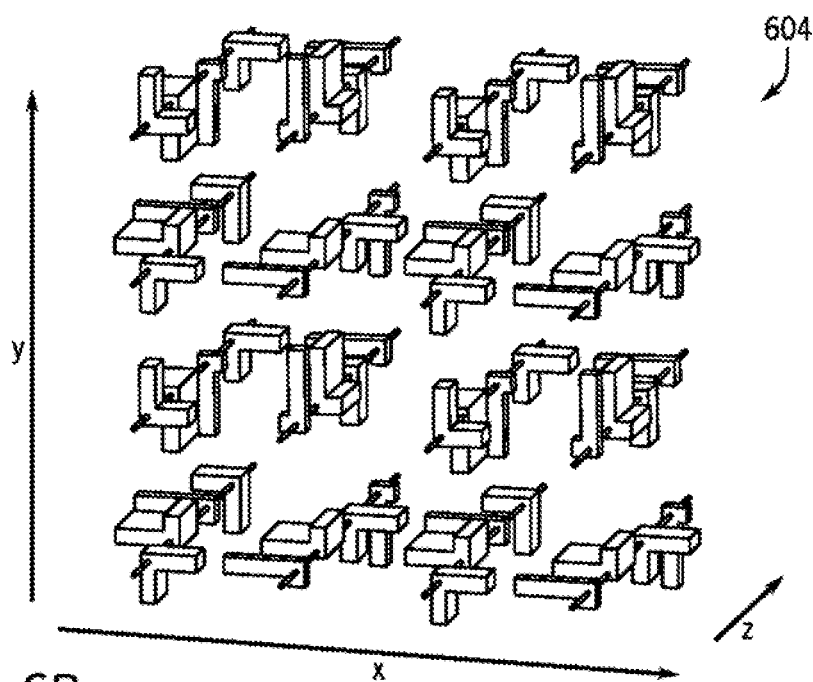

To reduce occlusion between graphlets, a "semi-orthographic projection" technique can be used. FIG. 6B shows an example 3D array 604 of graphlets visualized using the semi-orthographic projection. With the semi-orthographic projection, the rows of 3D graphlets are arranged so that each row of 3D graphlets appear to have a same length and a same angle with respect to a reference axis, where the reference axis can be any arbitrary axis (such as the z axis).

The angle of this semi-orthographic view can be arranged to provide an orientation that optimizes the view down each row, to reduce occlusion of neighboring graphlets. The orientation of each row is the same in a 3D array of graphlets.

With the semi-orthographic view, rows of graphlets can be rendered with perspective, while still satisfying the property that each row has a same length and a same angle with respect to a reference axis. These perspective cues are useful to convey depth, which may not be possible in a fully orthographic projection. In particular, the semi-orthographic view allows the 3D visualization to be rendered using stereo-3D rendering techniques (using a pair of perspective cameras) creating true stereo-3D depth from disparity.

A user can select between either the perspective view or semi-orthographic view, by selecting a user interface element in the filter panel 220 of FIG. 2.

FIGS. 7A and 7B illustrate an example of the providing the semi-orthographic projection discussed above. FIG. 7A shows several rows 702, 704, 706, and 708 of graphlets, where each row includes three graphlets (represented by rectangles) in the example.

FIG. 7A provides a representation of an un-occluded view of the graphlets along row 706 from the viewpoint 710 of a user's eye—in other words, at the viewpoint 710 of the user's eye 710 shown in FIG. 7A, each graphlet of row 706 is visible to the user. However, with the arrangement of graphlets shown in FIG. 7A, the graphlets of some other rows may not be fully visible. For example, some graphlets in row 708 may be occluded by those in 706, while graphlets farthest from the user's eye in row 704 may be occluded by those nearer.

The semi-orthographic projection of the rows 702, 704, 706, and 710 are shown in FIG. 7B, in which the orientations of the rows 702, 704, 706, and 710 are changed with respect to the viewpoint 710. In FIG. 7B the graphlets in each of the rows are visible to the user at the viewpoint 710.

In some implementations, various interactions can be performed with respect to a visualized 3D array of graphlets. In addition to the various interactions discussed above, other interactions with respect to a visualized 3D array of graphlets are also possible.

For example, a user can perform navigation with respect to the 3D array of graphlets, including orbiting, zooming and panning around the 3D array. In the case of the semi-orthographic view, orbiting can be replaced by changing the angle between the row axis and the viewpoint, while panning and zooming can involve moving the viewpoint with respect to the 3D array of graphlets while keeping the angle unchanged. In the case of orbiting, the angular distance between each row may be changed to prevent the views overlapping, resulting in one row occluding another.

In other examples, individual graphlets can be selected, e.g. with a mouse click or a touch input on a touchscreen, and the properties associated with the selected graphlet can be displayed in a property panel (e.g. 208 in FIG. 2).

As discussed above, each array dimension can include hierarchies of category groups. Expandable or collapsible elements can be represented by a "+" or "−" icon next to the respective axis label; clicking on this icon can initiate the group pension or collapse.

FIG. 8 is a block diagram of a system 800 according to some implementations. The system 800 can be implemented on a computer or an arrangement of computers. The system 800 includes a processor (or multiple processors) 802. A processor can include a microprocessor, a microcontroller, a physical processor module or subsystem, a programmable integrated circuit, programmable gate array, or another physical control or computing device.

The processor(s) 802 can be coupled to a non-transitory machine-readable or computer-readable storage medium (or storage media) 806. The storage medium for storage media) 806 can store machine-readable or machine-executable instructions that are executable on the processor(s) 802. The machine-readable or machine-executable instructions can include graphlet visualization instructions 808 to perform visualization as discussed above. In some examples, instructions for graphlet placement can be executed in a computer that is separate from another computer that executes instructions for rendering interactive visualizations containing the arrays of graphlets. Although not shown, a user input device (e.g. mouse device, touchscreen) can be provided to allow for user interaction, and a display device can be provided to display a visualization. Data to be visualized can be stored in the storage medium or storage media 806) or in a storage medium at another system.

The storage medium (or storage media) 806 can be implemented with one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   generating, by a system including a processor, a visualization that includes a multidimensional array of multidimensional (3D) graphlets, the multidimensional array arranging the multidimensional graphlets in a plurality of dimensions, and wherein each of the multidimensional graphlets includes multiple dimensions;
   representing, by the system, respective attributes of data records with the plurality of dimensions of the multidimensional array; and
   representing, by the system, respective additional attributes of the data records with the multiple dimensions and a vibration characteristic of the multidimensional graphlets in the multidimensional array, the multiple dimensions of each respective multidimensional graphlet of the multidimensional graphlets comprising a height that represents a first additional attribute of a corresponding data record of the data records, a width that represents a second additional attribute of the corresponding data record, and a depth that represents a third additional attribute of the corresponding data record, and different vibration frequencies or different vibration amplitudes of each respective multidimensional graphlet representing corresponding different non-zero values of a fourth additional attribute of the corresponding data record.

2. The method of claim 1, further comprising:
   representing a fifth additional attribute of the corresponding data record using another characteristic of each respective multidimensional graphlet, wherein the another characteristic includes a color or shape of the respective multidimensional graphlet.

3. The method of claim 1, wherein at least some of the multidimensional graphlets have different orientations in the multidimensional array, wherein the respective attributes of the data represented by the plurality of dimensions of the multidimensional array includes a first attribute, wherein a first orientation of a given multidimensional graphlet of the multidimensional graphlets represents a negative value of the first attribute, and a second orientation of the given multidimensional graphlet represents a positive value of the first attribute.

4. The method of claim 1, wherein at least some of the multidimensional graphlets in the multidimensional array have different shapes that represent respective different values of a fifth additional attribute of the additional attributes.

5. The method of claim 1, wherein the multidimensional array is a 3D array.

6. The method of claim 1, wherein the plurality of dimensions of the multidimensional array include a first set of dimensions, and wherein the attributes represented by the first set of dimensions include a first set of attributes of the data records, the method further comprising:
   detecting selection of a slice in the multidimensional array of multidimensional graphlets; and
   in response to the selection, generate another visualization that includes a different multidimensional array that arranges multidimensional graphlets in a second, different set of dimensions that represent respective attributes of a second, different set of attributes of the data records.

7. The method of claim 1, further comprising:
   adding a visual feature to a first multidimensional graphlet of the multidimensional graphlets to represent a value that is based on aggregation of values of an attribute represented by a first dimension of the first multidimensional graphlet.

8. The method of claim 1, further comprising:
   in response to a drilldown selection of at least one category of categories of one of the attributes represented by the plurality of dimensions of the multidimensional array, generating a further visualization that depicts multidimensional graphlets corresponding to sub-categories of the selected at least one category.

9. The method of claim 1, further comprising applying a semi-orthographic projection of the multidimensional graphlets along a given dimension of the plurality of dimensions of the multidimensional array so that lines of the multidimensional graphlets in the given dimension appear to have a same length and a same angle with respect to a reference axis, but still maintain an appearance of depth.

10. The method of claim 1, wherein the height of the respective multidimensional graphlet varies with a value of the first additional attribute, the width of the respective multidimensional graphlet varies with a value of the second additional attribute, and the depth of the respective multidimensional graphlet varies with a value of the third additional attribute.

11. A system comprising:
    at least one processor to:
      map attributes of data records to a plurality of dimensions of a multidimensional array of multidimensional graphlets;
      map further attributes of the data records to respective characteristics of the multidimensional graphlets, the characteristics of the multidimensional graphlets including first, second, and third dimensions of each of the multidimensional graphlets and vibration motion of the multidimensional graphlets, wherein the first, second, and third dimensions of each respective multidimensional graphlet of the multidimensional graphlets represent respective first, second, and third further attributes of a corresponding data record of the data records, and wherein different vibration frequencies or different vibration amplitudes of each respective multidimensional graphlet represents corresponding different non-zero values of a fourth further attribute of the corresponding data record; and generate an interactive visualization including the multidimensional array of the multidimensional graphlets, the interactive visualization including control elements selectable to control an appearance of the multidimensional graphlets and a view of an arrangement of the multidimensional graphlets in the multidimensional array, wherein the first, second, and third dimensions of each respective multidimensional graphlet in the view have respective extents based on values of the respective first, second, and third further attributes of the corresponding data record, and wherein the vibration motion of each respective multidimensional graphlet is based on a value of the fourth further attribute of the corresponding data record.

12. The system of claim 11, wherein the at least one processor is to further:

in response to a first user input, change a visibility of at least some of the multidimensional graphlets to make other multidimensional graphlets more visible.

13. The system of claim 11, wherein the plurality of dimensions of the multidimensional array include a first set of dimensions, wherein the attributes represented by the first set of dimensions include a first set of attributes, and wherein the at least one processor is to further:

detect selection of a slice in the multidimensional array of multidimensional graphlets; and in response to the selection, generate another visualization that includes a different multidimensional array that arranges multidimensional graphlets in a second, different set of dimensions that represent respective attributes of a second, different set of attributes of the data records.

14. The system of claim 11, wherein the first, second, and third dimensions of the respective multidimensional graphlet comprise a height that is based on the value of the first further attribute of the corresponding data record, a width that is based on the value of the second further attribute of the corresponding data record, and a depth that is based on the value of the third further attribute of the corresponding data record.

15. The system of claim 11, wherein the view further comprises a graphical element added to a first multidimensional graphlet of the multidimensional graphlets, the graphical element having a characteristic that is based on aggregating values of one of the first, second, and third further attributes.

16. The system of claim 11, wherein a first multidimensional graphlet in the view has a color that is based on a value of a fifth additional attribute.

17. An article comprising a non-transitory machine-readable storage medium storing instructions that upon execution cause a system to:

generate a visualization that includes a three-dimensional (3D) array of 3D graphlets, the 3D array arranging the 3D graphlets in dimensions of the 3D array, and wherein each of the 3D graphlets includes a 3D structure that has a height dimension, a depth dimension, and a width dimension;

represent respective attributes of data records with the dimensions of the 3D array;

represent respective first, second, and third additional attributes of the data records with the height dimension, the depth dimension, and the width dimension of the 3D graphlets, wherein a height of each respective 3D graphlet of the 3D graphlets is based on a value of the first additional attribute of a corresponding data record of the data records, a width of the respective 3D graphlet is based on a value of the second additional attribute of the corresponding data record, and a depth of the respective 3D graphlet is based on a value of the third additional attribute of the corresponding data record, wherein different vibration frequencies or different vibration amplitudes of each respective multidimensional graphlet represents corresponding different non-zero values of a fourth additional attribute of the corresponding data record; and output the visualization for display by a display device.

18. The article of claim 17, wherein the instructions upon execution cause the system to further:

change types of the 3D graphlets included in the visualization over time, to represent a time attribute.

19. The article of claim 17, wherein the instructions upon execution cause the system to:

represent a fifth additional attribute of the data records with different shapes of the 3D graphlets.

\* \* \* \* \*